(No Model.) 2 Sheets—Sheet 1.

J. T. & G. W. HAMILTON.
HARROW.

No. 370,867. Patented Oct. 4, 1887.

Witnesses.
Frank Unckles
E. J. Ferguson

Inventor
James T. Hamilton
Gail W. Hamilton (No Model.) 2 Sheets—Sheet 2.

J. T. & G. W. HAMILTON.
HARROW.

No. 370,867. Patented Oct. 4, 1887.

Witnesses:
Frank Unckless
E. I. Ferguson

Inventor:
James T. Hamilton
Gait W. Hamilton

United States Patent Office.

JAMES T. HAMILTON AND GAIL W. HAMILTON, OF FRIEND, NEBRASKA.

HARROW.

SPECIFICATION forming part of Letters Patent No. 370,867, dated October 4, 1887.

Application filed April 26, 1887. Serial No. 236,237. (No model.)

*To all whom it may concern:*

Be it known that we, JAMES T. HAMILTON and GAIL W. HAMILTON, both residing at Friend, in the county of Saline and State of Nebraska, citizens of the United States, have invented a new and useful Improvement in Harrows, of which the following is a specification, reference being had to the accompanying drawings, in which—

Figure 1:
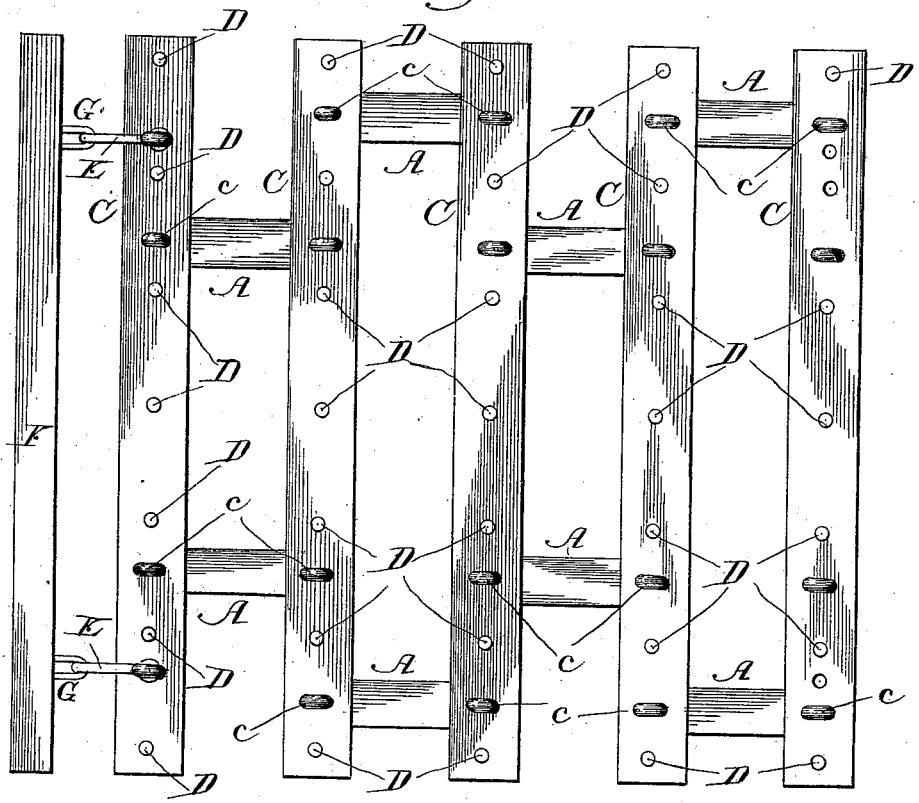
Figure 2:
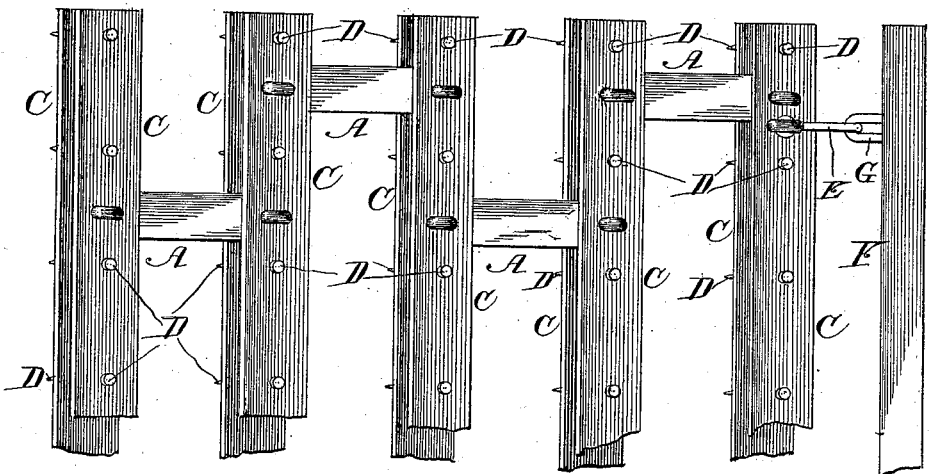
Figure 3:
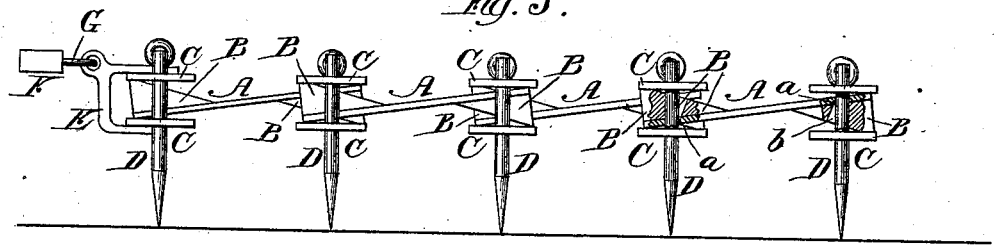
Figure 4:
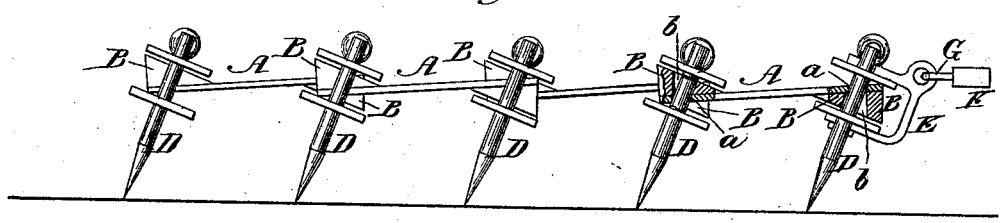
Figure 5:
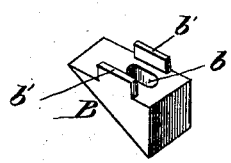

Figure 1 is a top or plan view with the harrow set to operate as a pulverizer; Fig. 2, a top or plan view with one end broken off, showing the harrow arranged to operate as a smoothing-harrow; Fig. 3, an end elevation of the harrow arranged as shown in Fig. 1, with one of the connecting-bars in section at each end; Fig. 4, an end elevation of the harrow arranged as shown in Fig. 2, with one of the connecting-bars sectioned at each end; Fig. 5, a detail, being a perspective view of the incline for the connecting-bars; Figs. 6, 7, 8, and 9, modifications of the connecting-bar and its incline.

This invention has for its object to construct a harrow which can be changed to operate either as a pulverizing-harrow or a smoothing-harrow by changing the hitch from one side to the other and have the harrow possess perfect flexibility and adaptability to adjust itself to uneven ground and to rise and fall, each section independent of the other, to follow the undulations in the ground, and also to allow each section to have a free end movement independent of the other sections in avoiding obstructions; and its nature consists in providing connecting-bars, each bar having at its ends or opposite sides an incline to fit between the plates carrying the teeth and allow the teeth-plates to rock; in providing a support for the teeth formed of two plates or bars, into which the teeth are inserted when the bars are hot, and locked firmly in place by the shrinkage of the bars in cooling, and in the several parts and combinations of parts hereinafter described, and pointed out in the claims as new.

In the drawings, A represents the connecting-bars, each bar being made of a piece of wrought-iron, steel, or other suitable material, and of the required length to locate the teeth-bars at the proper or desired distance apart.

Figure 7:
Figure 6:
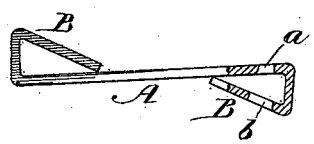
Figure 8:
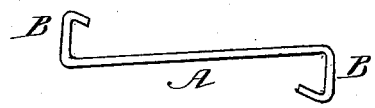
Figure 9:

B represents the inclines, one for each end of each bar A, and formed of cast-iron or other suitable material, as shown in Fig. 5, to have a flat face to fit against the face of the bar, and having, as shown in Fig. 5, lugs $b'$ to enter openings in or pass on each side of the bar and lock the inclines securely to the bars, and having the face opposite to the plain face inclined, as shown in Figs. 3, 4, and 5. The end of each bar A is provided with a hole, $a$, which coincides with a slot, $b$, formed in the incline B, as shown in Figs. 3, 4, and 5, and through which hole $a$ and slot $b$ a pin or bolt is passed for securing the end of the bar in position between the bars for the harrow-teeth. The inclines B can be formed with the bar A by turning each end of the bar back onto itself, as shown in Fig. 6, to form an inclined face on opposite sides of the bar, the bar having a hole, $a$, at the end, and the incline B having a slot, $b$, to coincide with the hole, or the bar can be formed, as shown in Fig. 7, with its ends turned so as to form bearing-points on which the teeth-bars can rock, in which case the bar A only is provided with the hole $a$; or the bar can be turned at each end, as shown in Fig. 8, to form the rocking points or inclines B, or the inclines can be placed on the same side of the bar, as in Fig. 9, and it is evident that the inclines for the bar A could be formed in various ways, so long as they present bearing-points to permit a rocking movement of the teeth-bars by which the teeth can stand vertical or in a straight line to form a pulverizing-harrow, or stand inclined in the direction of travel to form a smoothing-harrow, as shown in Figs. 3 and 4.

C represents the bars supporting the harrow-teeth, each bar being made of wrought-iron or other suitable material which can be expanded by heat, so as to contract in cooling and lock the teeth in place, and for an ordinary-sized harrow the bars C can be an inch and a quarter wide by a quarter of an inch thick, thus making a very light frame to support the teeth. The bars C are each provided with holes in line for the passage of pins or bolts $c$, by which the ends of the connecting-bars A are secured in place between the bars C, a pin, $c$, passing through the hole $a$ and slot $b$ of the incline B, which slot is elongated in the direction of the rock of the harrow to allow of the rocking movement of the bars or frame C.

D represents the harrow-teeth, made of cast-steel or other suitable material, having a pointed end, as usual, and, as shown, these teeth have their body round and are locked or held in position in the bars or frame C by heating the bars, so as to expand the hole through which the tooth passes, and then slipping the tooth into place and allowing the bars to cool, which contracts the metal of the bars closely around the body of the teeth and securely locks the teeth in place. This manner of locking the teeth in the bars or frame C is very effectual; but it is to be understood that the teeth can be locked in position by keys, splines, nuts, or in any other suitable and well-known manner, without departing from the feature of the bars A with the inclines B to permit of a rocking movement of the bars.

E represents the clevises, attached to the forward bars or frame C at either end by means of suitable pins or bolts, the clevises being located at a sufficient distance apart for the attachment of a doubletree or evener.

F is a doubletree or evener, to which singletrees or any other suitable hitch for the team is applied.

G represents loops or eyes on the doubletrees for attachment to the clevises E.

The teeth are secured in the bars or frame C, and as many of such bars or frames as are required for the desired size of harrow are connected one with the other by the connecting bars A, as shown in Fig. 1, the connection being made by the pins or bolts $c$, which pass through holes in the bars or frame C, and through the holes $a$ and slots $b$ in the bars A and inclines B. The clevis is hitched at either side of the harrow as required to produce a pulverizing or a smoothing harrow.

If the hitch is as shown in Figs. 1 and 3, the harrow is a pulverizing-harrow, the teeth D in use standing in a vertical plane, and if the hitch is as shown in Figs. 2 and 4 the harrow is a smoothing-harrow, the teeth standing, as shown, inclined in the direction of the pull, and in use the teeth are maintained either vertical or inclined by the pull on the harrow, which tends to draw the bars or frames C, when the hitch is as shown in Figs. 1 and 3, to have the contact of the bars C, with the flat faces of the connecting-bars A locking the bars or frame C in a horizontal plane and holding the teeth in a vertical plane, and when the hitch is as shown in Figs. 2 and 4 the pull draws in a direction to have the contact of the bars C with the faces of the inclines B locking the teeth in an inclined position. This rocking movement in the direction of the draw to form a pulverizing or a smoothing harrow is permitted by the inclines B, which inclines lie on the faces or on opposite faces of the bar A, so that a clear space is left on the under side or the upper side of one end and the upper or under side of the other end for the bars or frames C to tip or turn to the limit allowed by the pitch of the incline, which can be varied to give a greater or less degree of pitch to the teeth; and it will be noticed that as the inclines of the several bars or frames C run in the same direction and parallel, with the widest end of one incline opposite the narrowest end of the other, a firm lock is formed by which the bars or frames C are interlocked to their respective connecting-bars at the same incline and in the same direction, and when the teeth are vertical the bars or frames C are locked by the engagement with the plain face of the connecting-bars, as shown in Fig. 3. The pins or bolts $c$, which connect the bars or frames C to their respective connecting-bars A, allow of an end movement of the bar or frame C, each independent of the other, to the extent of the swing of the connecting-bars before striking a tooth, and the inclines B allow of a fore-and-aft rock of the bars or frames C, so that the harrow as a whole is flexible in all directions, by which the undulations of the ground can be followed and the sections or frames C can dodge or ride over obstructions.

The harrow-teeth D, instead of being round, as shown, can be of a square, diamond, or V-shaped form in cross-section, and the harrow-teeth can be inserted while the bar is cold and locked in place by driving back the swell made by the tooth on the under side of the bar when the body of the tooth is larger than the hole therefor.

What we claim as new, and desire to secure by Letters Patent, is—

1. A connecting-bar for harrow-sections having an incline at each end for giving the harrow-teeth a vertical or inclined position, substantially as and for the purpose specified.

2. The connecting-bars A, having an incline at each end, in combination with the bars or frames C of a harrow, for connecting the bars or frames, substantially as and for the purposes specified.

JAMES T. HAMILTON.
GAIL W. HAMILTON.

Witnesses:
ISAAC MEHURON,
W. J. ORGAN.